Figure 8:
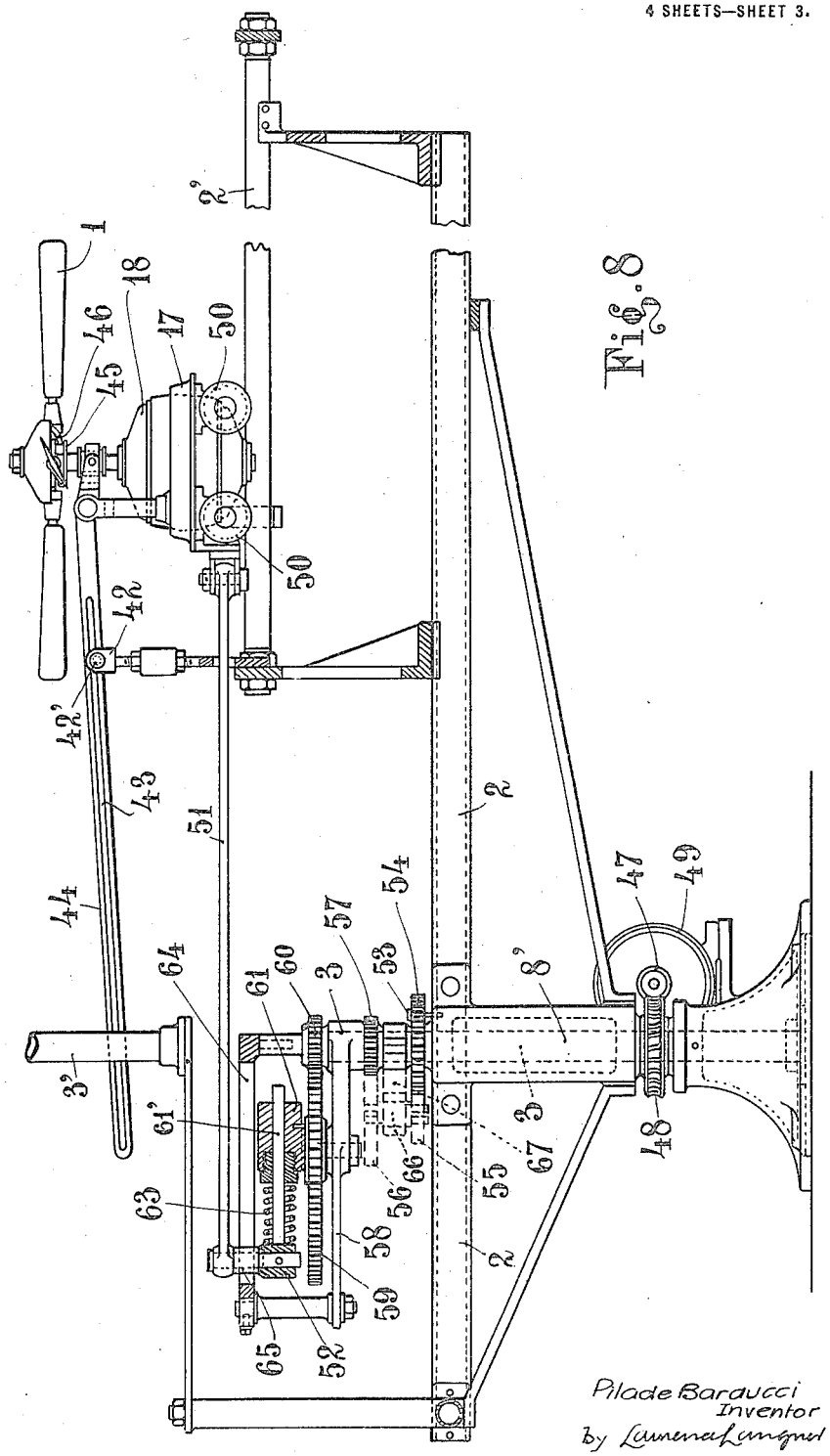

P. BARDUCCI.
DRYING CHAMBER.
APPLICATION FILED APR. 12, 1916.
1,248,437.
Patented Dec. 4, 1917.
4 SHEETS—SHEET 1.
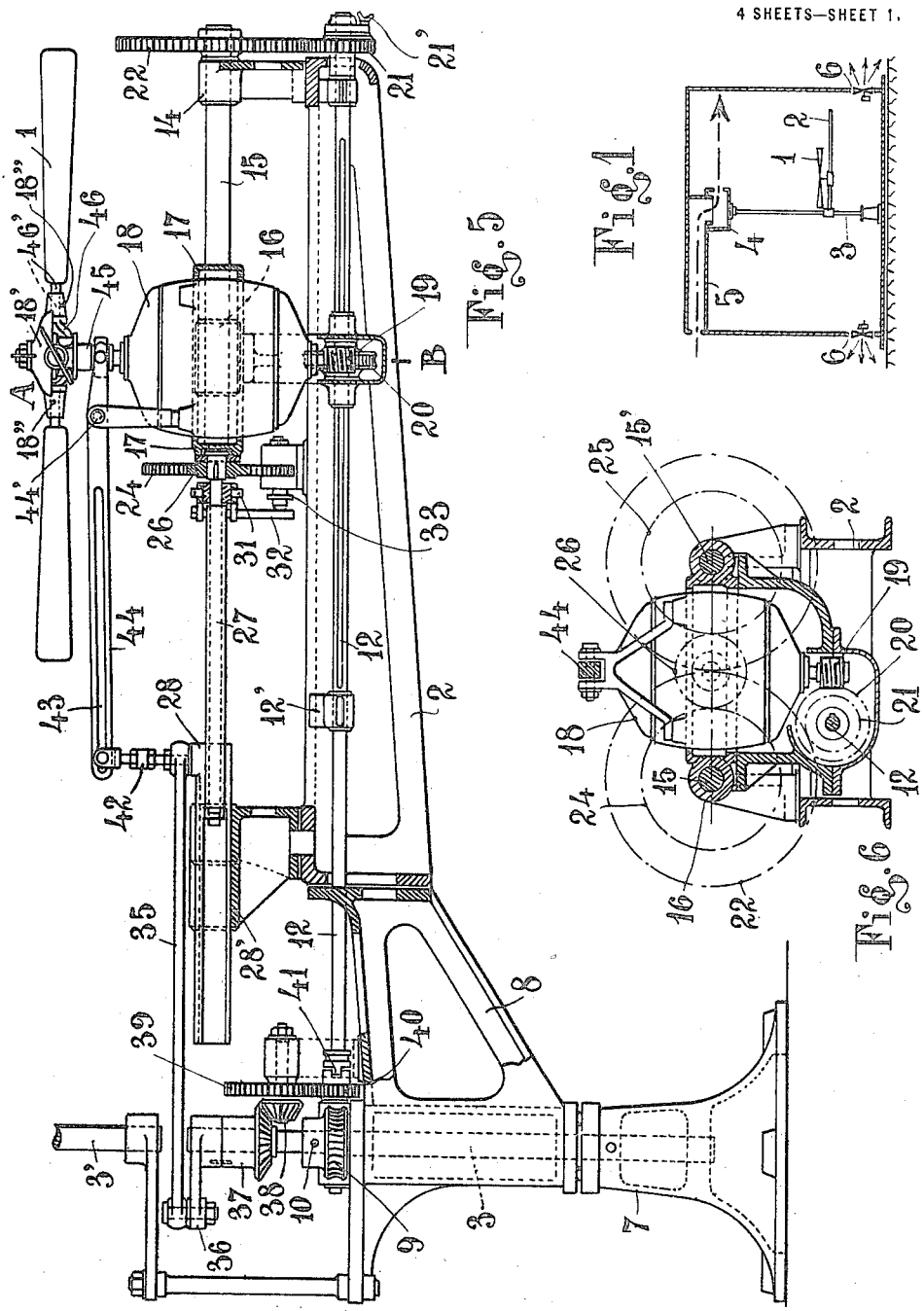
Pilade Barducci
Inventor
By Laurence Langner
Attorney P. BARDUCCI.
DRYING CHAMBER.
APPLICATION FILED APR. 12, 1916.
1,248,437.
Patented Dec. 4, 1917.
4 SHEETS—SHEET 2.
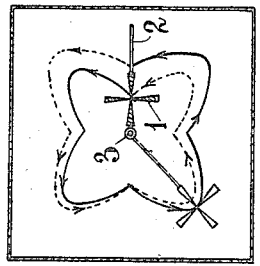
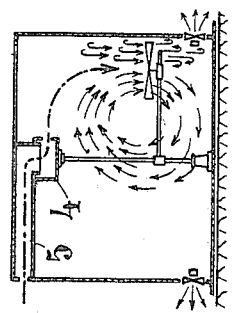
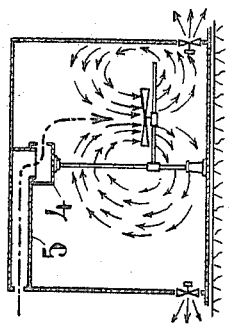
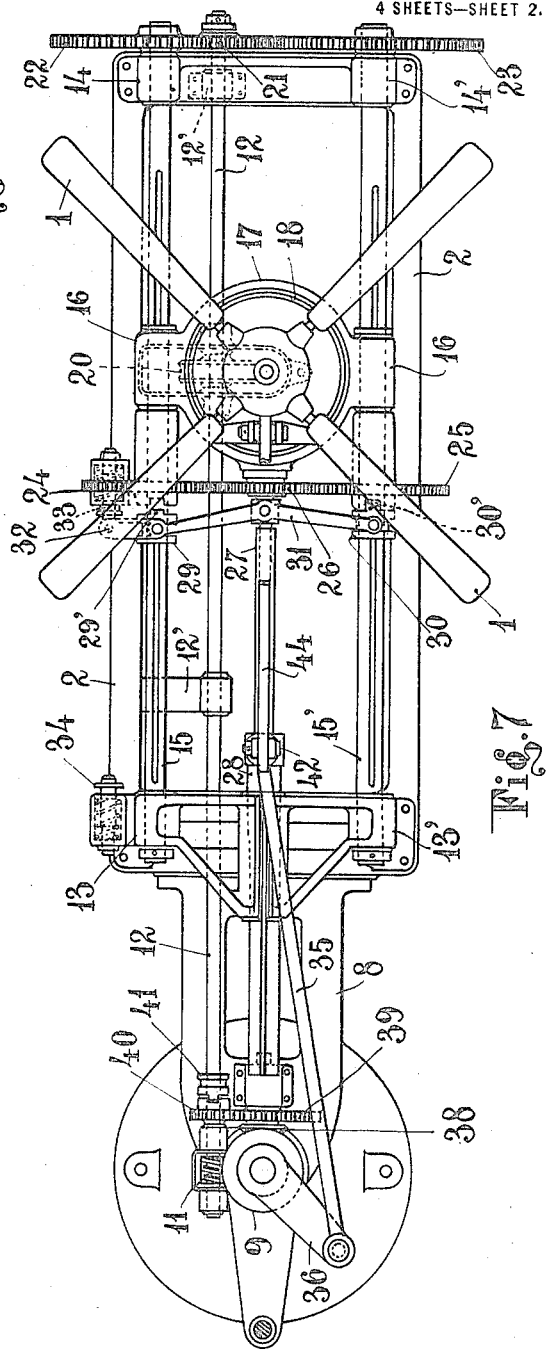
Pilade Barducci
Inventor
By Laurence Langner
Attorney.

P. BARDUCCI.
DRYING CHAMBER.
APPLICATION FILED APR. 12, 1916.

1,248,437.

Patented Dec. 4, 1917.
4 SHEETS—SHEET 3.

Pilade Barducci
Inventor
by Laurence Langner
Attorney

P. BARDUCCI.
DRYING CHAMBER.
APPLICATION FILED APR. 12, 1916.
1,248,437.
Patented Dec. 4, 1917.
4 SHEETS—SHEET 4.
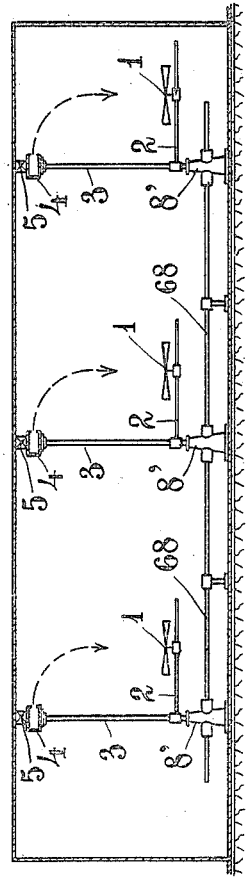
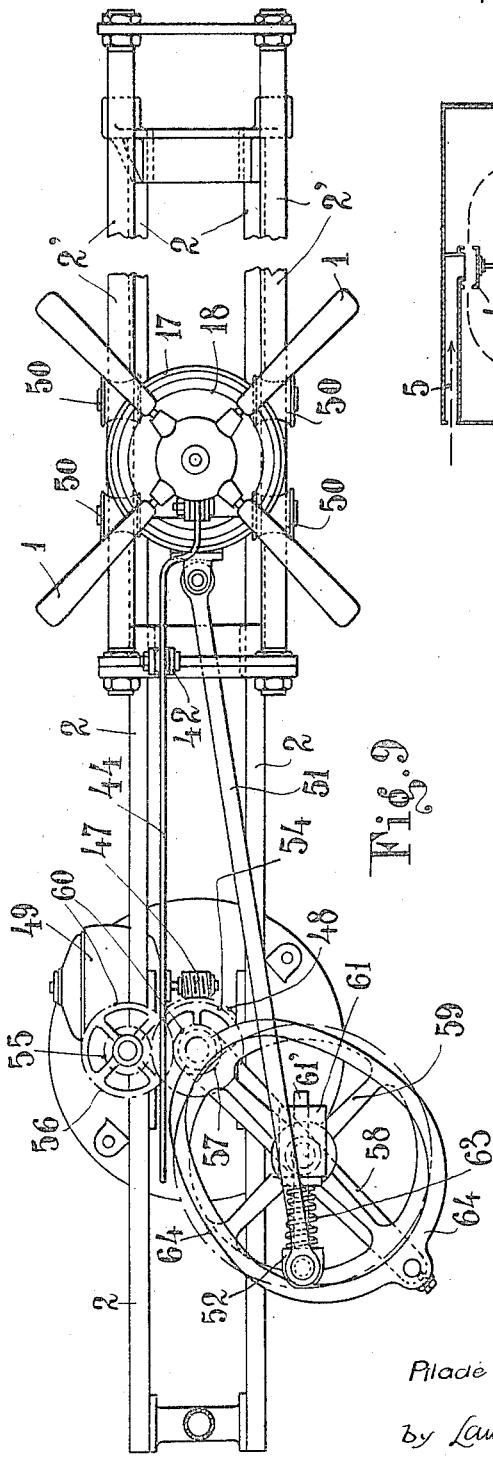
Pilade Barducci
Inventor
by Laurence Langner
Attorney

UNITED STATES PATENT OFFICE.

PILADE BARDUCCI, OF NAPLES, ITALY.

DRYING-CHAMBER.

1,248,437.  Specification of Letters Patent.  Patented Dec. 4, 1917.

Application filed April 12, 1916. Serial No. 90,648.

*To all whom it may concern:*

Be it known that I, PILADE BARDUCCI, a subject of the King of Italy, residing at Naples, Italy, have invented certain new and useful Improvements in Drying-Chambers, of which the following is a specification.

This invention relates to an apparatus intended to produce air currents in drying chambers, each of said air currents traveling in the chamber and acting on the material to be dried in opposite directions and with different intensities during its travel.

The apparatus according to this invention comprises one or more fans each mounted to reciprocate on an arm which in turn rotates around a given point of the chamber means being provided for varying the output of the fan in accordance with the position of the same on the rotating arm; a drying action is thus obtained which is regular and uniform in the whole chamber.

The annexed drawings show by way of example some constructions of the apparatus according to this invention.

In said drawings Figure 1 is a diagram in transverse section of a chamber provided with a fan arranged according to this invention; Fig. 2 is a diagram showing the air streams produced by the fan in one of its positions; Fig. 3 is a similar diagram the fan having another position; Fig. 4 is a plan view of the chamber showing by way of example one of the paths along which the fan may travel; Fig. 5 shows in side view and enlarged scale a construction of the member carrying the fan; Fig. 6 is a transverse section on A—B of Fig. 5; Fig. 7 is the plan view of said member; Fig. 8 is a side view of a modified construction of said member; Fig. 9 is the plan view of the same; Fig. 10 shows in diagram an arrangement comprising two arms and fans, and Fig. 11 shows a chamber in which a plurality of arms and fans are arranged.

As shown by way of example in Figs. 1, 2, 3, 4, 10, 11, a fan 1 is mounted to reciprocate on an arm 2 which rotates around a stationary support 3; the fresh air is fed by a duct 5 provided with a rotating mouth 4 which is operated in accordance with the arm 2, so that said fresh air is supplied at any time in the direction of arm 2 and the same feeds the fan 1 during its reciprocations. Said fresh air is thus supplied in a horizontal current when the fan 1 is at rest (Fig. 1) and is deviated by the same during its reciprocation (Figs. 2, 3, 10, 11) and finally is exhausted through ports 6. Obviously the fan or fans 1 must be arranged between mouth 4 and ports 6, these latter being arranged near the floor when mouth 4 is near the ceiling or vice-versa.

The support comprises a base portion 7 and a vertical axis 3 (Fig. 5) on which is mounted to rotate a bracket 8 carrying a projecting arm 2. A helicoidal gear wheel 9 is mounted on axis 3 above the bracket 8 and may be made fast to said axis by means of a cotter or pin 10, said wheel being thus stationary and engaging a worm wheel 11 keyed on shaft 12 pivoted in bearings 12' of arm 2.

On arm 2 two longitudinal shafts 15, 15' are also mounted by means of bearings 13, 13' and 14, 14', on which slide sleeves 16 solid with a collar 17 bearing the electromotor 18 which operates the fan 1 (Fig. 7).

A worm gear 19 is secured on the motor shaft and operates a gear wheel 20 (Figs. 5 and 6) which is made to rotate with shaft 12 by means of a feather sliding in a keyway of said shaft; this latter is provided at its outer end with a wheel 21 made fast to it by a pin 21' and engaging with wheels 22 and 23 fast to shafts 15 and 15' respectively.

Loose on shafts 15 and 15' are the wheels 24 and 25 engaging both with an intermediate wheel 26 fast to a screw threaded rod 27 one end of which is mounted to rotate on collar 17 while its free end is engaged in a corresponding sleeve 28.

Sleeves 29 and 30 are mounted to slide on shafts 15 and 15' respectively and are caused to rotate therewith by means of feathers engaging longitudinal slots of said shafts, said sleeves being controlled by the fork ends of a yoke 31 intended to be swung at the end of each stroke of screw threaded rod 27 by its tail 32 engaging either of stops 33 or 34 carried by arm 2; these stops are preferably provided with a shock absorbing spring as shown in the drawings.

Said sleeves 29 and 30 are provided with teeth 29' and 30' intended to engage corresponding recesses of the hubs of wheels 24 and 25 in order to cause either of said wheels to be fast to its own shaft according to the position of yoke 31, and thus the screw threaded rod 27 is operated in one direction or in the opposite one, the shafts 15 and 15′ rotating in opposite directions with regard to each other.

The screw threaded sleeve 28 in which rod 27 is engaged is connected by a rod 35 with a crank arm 36 fast to a pinion 37; this latter is loose on shaft 3 and engages with pinion 38 fast to a gear wheel 39 gearing with wheel 40 which may be made fast to shaft 12 by means of a clutch 41. The sleeve 28 is further provided with an arm 42 the fork end of which is provided with a pin sliding in the slot 43 of a lever 44 pivoted at 44′ on the motor casing; the other end of said lever controls a grooved sleeve 45 sliding on the motor shaft and operating fingers 46 each fast to the pivot 46′ of one of the fan blades; as shown in the drawings said blades are pivoted in bearings 18″ carried by the head 18′ fast to the motor shaft and they are thus able to take different inclinations to vary the output of the fan in accordance with the operation of the apparatus.

As described the motor 18 drives shaft 12 which operates the worm gear 11 engaging with stationary pinion 9, so that arm 2 and the parts connected therewith are caused to rotate around axis 3.

At the same time the wheel 21 drives wheels 22 and 23 and thence shafts 15 and 15′, either of the same being fast to the proper wheel 24 or 25 according to the position of yoke 31 and the screw threaded rod 27 is rotated so as to come into or out from the sleeve 28, the motor 18 being thus caused to slide with collar 17 and sleeves 16 along shafts 15 and 15′; the movement of motor 18 is effected in one direction or in the opposite one according to the direction in which wheel 26 and rod 27 are operated by either of wheels 24 and 25, the motion of said motor being reversed at the end of each stroke by operation of yoke 31 and parts connected therewith as described.

The shaft 12 drives also the crank arm 36 by means of clutch 41, wheels 40 and 39 and pinions 38 and 37 said crank arm driving rod 35 and sleeve 28 which reciprocates in guide-way 28′. The motor casing 18 and fan 1 are thus put in reciprocation independently from and in addition to the operation of screw 27.

By giving gears 37, 38, 39 and 40 such a gearing ratio as to cause the crank arm 36 to make four revolutions each revolution of arm 2 the fan is caused to move away from the central support 3 when said arm 2 is passing in the direction of two perpendicular diameters of its path, this feature being useful in connection with square chambers, as shown in Fig. 4, in which case said diameters are arranged in the direction of the corners of the chamber.

The reciprocation of sleeve 28 causes the lever 44 to oscillate around its pivot 44′ as said sleeve 28 is provided as described with an arm 42 having a pin engaging the slot 43 of lever 44, the blades 1 of the fan being thus moved by sleeve 45 and fingers 46 around their pivots 46′ in order to vary gradually their inclination and increase the output of the fan when this latter is moving outwardly from the axis 3. This is required in order to obtain uniform ventilation in the chamber owing to the increased circumferential speed of the fan around axis 3 when said fan is at a greater distance from the center of rotation of arm 2.

By removing the pin 10 securing wheel 9 on axis 3, the shaft 12 will no longer drive arm 2, this latter being thus stationary and being able to be displaced by hand if required; the operation of screw 27 may be stopped by removing pin 21′ so as to leave stationary wheels 21, 22, 23, shafts 15 and 15′, wheels 24, 25 and 26; finally by disengaging the clutch 41 of wheel 40 the crank 36 operating rod 35 and sleeve 28 may be put out of operation.

Figs. 8 and 9 show another construction of the described apparatus in which a sleeve 8′ rotating on the stationary axis 3 and carrying brackets 2 is driven by means of worm gear 47 and helicoidal wheel 48 by an electromotor 49 independent from that operating the fan.

In this construction the collar 17 carrying the motor 18 of the fan 1 is provided with rollers 50 sliding on rods 2′ secured on brackets 2, and is connected by a rod 51 with a head 52, this latter being operated in the manner hereinafter described so as to drive the fan carriage in the required manner.

To this end a toothed wheel 54 is made fast to sleeve 8′ by means of a pin 53 or the like, said wheel 54 gearing with a pinion 55 fast to shaft 66 pivoted in a bracket 67 and carrying pinion 56 which in turn meshes with a fourth pinion 57, solid with a crank arm 58; the gearing ratio of said pinions is preferably such as to cause crank arm 58 to make four revolutions each revolution of the sleeve 8′. On crank arm 58 is pivoted an idle wheel 59 engaging with a stationary pinion 60 keyed on axis 3, said idle wheel 59 being provided with a sleeve 61 in which is mounted to slide a rod 61′. This latter carries the head 52 provided with roller 65, which is pushed by a spring 63 in contact with the inner edge of a profiled ring 64 (Figs. 8 and 9) fast to crank arm 58 and pivoted on axis 3.

When the sleeve 8′ is put in rotation around the axis 3 the head 52 makes a stroke depending upon the combination of rotations of ring 64 carried by crank arm 58 and of sleeve 61 carried by wheel 59. By giving this latter wheel such a diameter as to cause the same to roll on stationary pinion 60 with a speed equal to ⅓ that of brackets 2 and the ring 64 being shaped as shown in Fig. 9, the fan 1 is caused to travel along the path shown in Fig. 4.

The inclination of the fan blades and hence the output of the fan are controlled by the lever 44 operating sleeve 45 which engages fingers 46; said lever 44 reciprocates with the motor and fan and is swung by the stationary rod 42 having a pin 42' passing through slot 43.

In the construction described each support is provided with a single arm and fan but obviously the standard may carry a number of arms 2 each having a fan 1 as shown by way of example in Fig. 10, in which there are two arms 2 each provided with a fan 1.

Fig. 11 shows diagrammatically another arrangement comprising a plurality of apparatus operated by a single transmission shaft 68; in this case the construction shown in Figs. 8 and 9 is to be used.

In the constructions illustrated the upper mouth 4 is controlled by an extended shaft 3' operated by the rotating member 8 or 8' for the purpose above referred to.

It is to be noted that the construction of the apparatus may be modified without departing from the spirit of the present invention, as for the purpose of the present invention it is only essential that the fan is caused to reciprocate along an arm put in rotation around a fixed point of the chamber the output of the fan being further modified during the stroke of the same along the supporting arm in accordance with its revolution speed.

Obviously the output of the fan could be controlled by modifying the speed of its rotating parts instead of varying the inclination of its blades.

What I claim as my invention and desire to secure by United States Letters Patent is:—

1. In an apparatus for ventilating drying chambers, means for agitating the air, a member carrying said means and means for causing the said member to travel along a path resulting as the combination of a rotating motion around a point of the chamber with a reciprocating motion toward and from said point.

2. In an apparatus for ventilating drying chambers, means for agitating the air, a member carrying said means, means for causing the said member to travel along a path resulting as the combination of a rotating motion around a point of the chamber with a reciprocating motion toward and from said point and means for extending said reciprocating motion in the direction of the corners of the chamber.

3. In an apparatus for ventilating drying chambers, means for agitating the air having a variable output, member carrying said means, and means for causing said member to travel along a path resulting as the combination of a rotating motion around a point of the chamber with a reciprocating motion toward and from said point.

4. In an apparatus for ventilating drying chambers, means for agitating the air, an arm rotatable around a vertical axis, carrying said means and means for causing the ventilating means to reciprocate on the arm.

5. In an apparatus for ventilating drying chambers, means for agitating the air, an arm rotatable around a vertical axis carrying said means, means for causing the ventilating means to reciprocate on the arm and means for varying the output of said agitating means depending upon its reciprocation.

6. In an apparatus for ventilating drying chambers, means for agitating the air, an arm rotatable around a vertical axis carrying said means, means for causing the ventilating means to reciprocate on the arm, and means for feeding the air which rotates in unison with said arm.

7. In a drying chamber in which the air is agitated by traveling means, a support, an arm rotatable around said support, a fan mounted to travel on said arm, means for driving said arm and means for causing said fan to reciprocate on said arm.

8. In a drying chamber in which the air is agitated by traveling fans, stationary supports, arms rotatable around the same, fans each mounted to travel on one of said arms, means for driving said arms and means for causing said fans to reciprocate on said arms.

9. In a drying chamber in which the air is agitated by traveling fans, fans each mounted to travel on a rotatable arm, supports for said arms, means for driving each arm, means for causing each fan to reciprocate on its arm, and means for feeding the air which rotates in accordance with said arms.

10. In a drying chamber in which the air is agitated by traveling fans, feathering blade fans each mounted to travel on a rotatable arm, supports for said arms, means for driving said arms, means for causing each fan to reciprocate on its arm, and means for varying the inclination of the fan blades during reciprocation.

11. In a drying chamber in which the air is agitated by traveling fans, feathering blade fans each mounted to travel on a rotatable arm, supports for said arm, means for driving each arm, means for causing each fan to reciprocate on its arm, means for extending the travel of each fan when its rotatable arm is in given positions, and means for varying the inclination of the fan blades during reciprocation.

12. In a drying chamber in which the air is agitated by traveling fans, an arm turning around a vertical axis for each fan, each fan being arranged with its motor in a support traveling on said arm, a screw threaded rod connected with said support, a screw threaded sleeve engaging said rod and mounted to reciprocate on the rotatable arm, means for rotating said rod, means for reversing the rotation of said rod at the ends of each stroke of the support, means for causing said sleeve to reciprocate when the rotatable arm is in the direction of the corners of the chamber and means for driving said rotatable arm.

13. In a drying chamber in which the air is agitated by traveling fans, an arm turning around a vertical axis for each fan, each fan having feathering blades and being arranged with its motor in a support traveling on said arm, a screw threaded rod connected with said support, a screw threaded sleeve engaging said rod and mounted to reciprocate on said rotatable arm, means for rotating said rod, means for reversing the rotation of said rod at the ends of the strokes of said support, means for causing said sleeve to reciprocate when the arm is in the direction of the corners of the chamber, means for varying the inclination of fan blades during reciprocation and means for driving said arm.

14. In a drying chamber in which the air is agitated by traveling fans, an arm turning around a vertical axis for each fan, each fan having feathering blades and being arranged with its motor in a support traveling on said arm, a screw threaded sleeve engaging said rod and mounted to reciprocate on each arm, two shafts pivoted on the arm and operated by the fan motor to drive said screw threaded rod in opposite directions, means operated at the ends of each stroke of the support for connecting either of said shafts with the screw threaded rod, a crank rotatable on the standard, a rod connecting said crank with said sleeve to reciprocate the same, means for causing said crank to make four revolutions each revolution of the rotatable arm, means for varying the inclination of the fan blades pending reciprocation and means for driving said rotatable arm.

15. In a drying chamber in which the air is agitated by traveling fans, an arm turning around a vertical axis for each fan, each fan having feathering blades and being arranged with its motor in a support traveling on said rotatable arm, a screw threaded rod connected with said support, a screw threaded sleeve engaging said rod and mounted to reciprocate on the arm, two shafts pivoted in said arm and operated by the fan motor to drive said screw threaded rod in opposite directions, means operated at the end of each stroke of the support for connecting either of said shafts with the screw threaded rod, a crank rotatable on the standard, a rod connecting said crank with said screw threaded sleeve to reciprocate the same, means for causing said crank to make four revolutions for each revolution of the rotatable arm, a lever pivoted on the fan support and controlling the fan blades, a member on the screw threaded sleeve operating said lever at each stroke of the fan support on the rotatable arm, means for driving said rotatable arm, means for feeding the air into the chamber and means for rotating the same.

16. In a drying chamber in which the air is agitated by traveling fans, an arm turning around a vertical axis for each fan, each fan having feathering blades and being arranged with its motor in a support traveling on said arm, means for reciprocating said support, means for varying the inclination of fan blades during reciprocation, means for feeding the air to each fan, and means for driving the rotatable arm and the air feeding means, all said means being driven by the fan motor.

17. In a drying chamber in which the air is agitated by traveling fans, an arm turning around a vertical axis for each fan, each fan having feathering blades and being arranged with its motor in a support traveling on said arm, means for reciprocating said support, means for varying the inclination of the fan blades during reciprocation, means for feeding the fresh air to each fan, means for driving said rotatable arm and the air feeding means, and a motor arranged on the standard operating said means.

18. In a drying chamber in which the air is agitated by traveling fans, an arm turning around a vertical axis for each fan, a fan arranged with its motor in a traveling support on each arm, a member revoluting around said standard, a rod connecting each fan support with the corresponding revoluting member, means for driving each revoluting member and means for driving each rotatable arm.

19. In a drying chamber in which the air is agitated by traveling fans, an arm turning around a vertical axis for each fan, a fan having feathering blades and arranged with its motor in a traveling support on each arm, a member traveling around the axis of the central standard, a rod connecting each support with the corresponding traveling member to reciprocate said support, means for varying the inclination of fan blades during reciprocation, means for driving each rotatable arm, and means for driving each traveling member with a given ratio with regard to the corresponding rotatable arm.

20. In a drying chamber in which the air is agitated by traveling fans, an arm turning around a vertical axis for each fan, a fan having feathering blades and arranged with its motor in a traveling support on each arm, a crank rotatable around the central standard and having a rim of substantially oval formation, an idle pinion on said crank, a pinion solid with the central standard gearing with said idle pinion; a member solid with said idle pinion, a rod sliding in said member and having a head, a spring pushing the head of said rod in contact with the inner edge of the shaped rim, a rod connecting said head with the fan support to reciprocate the same, means for driving the crank and the rotatable arm with different speeds, and means for varying the inclination on fan blades during reciprocation.

21. In a drying chamber in which the air is agitated by traveling fans, an arm turning around a vertical axis for each fan, a feathering blade fan arranged with its motor in a traveling support on each arm, a crank rotatable around the axis of the central standard, a rim of substantially oval formation on said crank, an idle pinion on said crank, a pinion solid with the central standard and meshing with said idle pinion, a member solid with said idle pinion, a rod sliding in said member and having a head, a spring pushing said head in contact with the inner edge of said rim, a rod connecting said head with the fan support to reciprocate the same, means for driving the rotatable arm, means for causing said crank to make four revolutions each revolution of said arm, and means for varying the inclination of the fan blades during reciprocation.

22. In a drying chamber in which the air is agitated by traveling fans, an arm turning around a vertical axis for each fan, a feathering blade fan arranged in a traveling support on each arm, a member traveling around the central standard with a speed and along a path different from that of the rotatable arm, a rod connecting said member with the fan support to reciprocate the same on the arm, a lever pivoted in said support and controlling the fan blades, a member on the rotatable arm operating said lever, means for driving said rotatable arm and means for driving said traveling member with a given ratio with regard to the rotatable arm.

In testimony whereof I affix my signature in presence of two witnesses.

PILADE BARDUCCI.

Witnesses:
NICOLO GUOWINI,
EDW. H. CAPP.

Copies of this patent may be obtained for five cents each, by addressing the "Commissioner of Patents, Washington, D. C."